United States Patent
Jeffery

(10) Patent No.: US 10,755,387 B2
(45) Date of Patent: Aug. 25, 2020

(54) FIREFLY DETECTION USING A PLURALITY OF BUFFERS

(71) Applicant: DreamWorks Animation LLC, Glendale, CA (US)

(72) Inventor: Keith Ralph Jeffery, Glendale, CA (US)

(73) Assignee: DreamWorks Animation LLC, Glendale, CA (US)

( * ) Notice: Subject to any disclaimer, the term of this patent is extended or adjusted under 35 U.S.C. 154(b) by 73 days.

(21) Appl. No.: 16/237,332

(22) Filed: Dec. 31, 2018

(65) Prior Publication Data

US 2020/0051216 A1   Feb. 13, 2020

Related U.S. Application Data

(60) Provisional application No. 62/716,853, filed on Aug. 9, 2018.

(51) Int. Cl.
| | |
|---|---|
| G06K 9/00 | (2006.01) |
| G06T 5/00 | (2006.01) |
| G06T 7/11 | (2017.01) |
| G06F 17/18 | (2006.01) |
| G06K 9/32 | (2006.01) |
| G06T 7/00 | (2017.01) |

(52) U.S. Cl.
CPC ............. G06T 5/002 (2013.01); G06F 17/18 (2013.01); G06K 9/3233 (2013.01); G06T 7/0002 (2013.01); G06T 7/11 (2017.01)

(58) Field of Classification Search
CPC . G06T 5/002; G06T 5/005; G06T 7/11; G06T 7/0002; G06F 17/18; G06K 9/3233
See application file for complete search history.

(56) References Cited

U.S. PATENT DOCUMENTS

| | | | |
|---|---|---|---|
| 6,697,663 B1 * | 2/2004 | Lin | A61B 6/032 |
| | | | 378/22 |
| 7,983,508 B2 * | 7/2011 | Guan | H04N 5/2353 |
| | | | 382/275 |
| 9,466,122 B1 * | 10/2016 | Robinson | G06T 7/11 |

(Continued)

OTHER PUBLICATIONS

Bitterli et al. "Nonlinearly Weighted First-order Regression for Denoising Monte Carlo Renderings" (Year: 2016).*

(Continued)

*Primary Examiner* — Aaron W Carter
(74) *Attorney, Agent, or Firm* — Lee, Hong, Degerman, Kang & Waimey

(57) ABSTRACT

A method for determining whether a pixel of a computer-rendered image is a firefly includes: dividing a plurality of samples originating from the pixel, into first and second subsets; identifying whether the pixel is an outlier based on variance data of the first subset; identifying whether the pixel is an outlier based on variance data of the second subset. The pixel is determined as not a firefly in response to both the pixel being identified as an outlier based on the variance data of the first subset, and the pixel being identified as an outlier based on the variance data of the second subset. The pixel is determined as a firefly in response to the pixel being not identified as an outlier based on the variance data of the first (second) subset and being identified as an outlier based on the variance data of the second (first) subset.

20 Claims, 11 Drawing Sheets

(56) References Cited

U.S. PATENT DOCUMENTS

| | | | | |
|---|---|---|---|---|
| 9,542,617 | B2* | 1/2017 | Senzaki | G06K 9/4604 |
| 2007/0147697 | A1* | 6/2007 | Lee | H04N 5/21 |
| | | | | 382/260 |
| 2007/0211307 | A1* | 9/2007 | Uvarov | G06T 5/002 |
| | | | | 358/463 |
| 2009/0046927 | A1* | 2/2009 | Chiang | G06T 5/20 |
| | | | | 382/167 |
| 2009/0190853 | A1* | 7/2009 | Noh | H04N 5/3572 |
| | | | | 382/264 |
| 2010/0104191 | A1* | 4/2010 | McGwire | G06T 7/11 |
| | | | | 382/190 |
| 2010/0215282 | A1* | 8/2010 | Van Beek | G06T 5/50 |
| | | | | 382/255 |
| 2010/0225790 | A1* | 9/2010 | Sasaki | H04N 5/213 |
| | | | | 348/241 |
| 2013/0272626 | A1* | 10/2013 | Robinson | G06K 9/0063 |
| | | | | 382/275 |
| 2014/0146049 | A1* | 5/2014 | Ozdas | G06T 15/06 |
| | | | | 345/426 |
| 2017/0272722 | A1* | 9/2017 | Salvi | G06T 1/60 |
| 2019/0130522 | A1* | 5/2019 | Lee | G06T 5/005 |
| 2019/0132535 | A1* | 5/2019 | Lee | G06K 9/628 |
| 2020/0051216 | A1* | 2/2020 | Jeffery | G06K 9/3233 |

OTHER PUBLICATIONS

Jeffery, Keith "Firefly Detection with Half Buffers" (Year: 2018).*
Rousselle et al. "Adaptive Rendering with Non-Local Means Filtering" (Year: 2012).*
Yuan, Hongliang, et al., "Adaptive rendering based on a weighted mixed-order estimator", Visual Computer, Springer, Berlin, DE, vol. 33, No. 6, May 2017, XP036248679, p. 695-704, 10 pages.
Christopher Decoro, et al., "Density-based Outlier Rejection in Monte Carlo Rendering", Computer Graphics Forum, vol. 29, No. 7, Sep. 2010, pp. 2119-2125, XP055589265, 7 pages.
Bochang Moon, et a., "Adaptive polynomial rendering", ACM Transactions on Graphics, vol. 35, No. 4, Jul. 11, 2016, XP058275821, 7 pages.
European Patent Office Application Serial No. 19153914.7, Search Report dated May 29, 2019, 7 pages.

* cited by examiner

FIREFLY DETECTION USING A PLURALITY OF BUFFERS

CROSS-REFERENCE TO RELATED APPLICATION(S)

Pursuant to 35 U.S.C. § 119(e), this application claims the benefit of U.S. Provisional Application No. 62/716,853, filed on Aug. 9, 2018, the contents of which are hereby incorporated by reference herein in its entirety.

BACKGROUND

Computer animation and other computer modeling applications may produce unwanted artifacts in a rendered image. Fireflies, or noise spikes, are an example of one type of such artifacts. Fireflies may be produced, for example, in Monte Carlo ray traced images. In a rendered image, fireflies may produce (or appear as) overly bright pixels that appear out of place in relation to neighboring (or nearby) pixels. Such a bright pixel may be considered as an outlier, in that it has an RGB luminance value that is significantly larger than what would be expected based on RGB luminance values of neighboring pixels.

FIGS. 1A and 1B illustrate examples of a rendered image 100. With reference to FIG. 1A, the fireflies 102 and 104 appear in a portion of the rendered image 100. With reference to FIG. 1B, the fireflies 102 and 104 are removed from the portion of the rendered image 100, such that visible fireflies do not appear in the rendered image 100.

Fireflies arise from low-probability events, and may be resolved in the limit as more samples are taken. However, resolving fireflies via rendering may be difficult. For example, these statistical anomalies may be so far out of an expected range that a time required for them to converge may be prohibitive, even barring numerical instabilities.

Aside from the general problem of fireflies marring a rendered image, differences in their color and variance values can cause problems for denoising solutions. For example, a distance calculation for non-local means filtering may not be robust under extreme differences in variance values.

SUMMARY

Embodiments of the present disclosure are directed to detecting fireflies and reducing a number of false positives. The fireflies may be removed to improve the rendered image and/or to make available data more uniform for denoising solutions. According to particular embodiments, a denoising framework that makes use of pixel variance and a plurality of buffers (e.g., half buffers) is utilized. The pixel variance provides better data than the color channels for determining which pixels contain fireflies. The half buffers provide at least some level of assurance that the detected firefly is an unwanted artifact, and not an expected highlight in the rendered image.

Embodiments of the present disclosure include systems, methods, and computer-readable media for determining whether a pixel of a computer-rendered image is (or includes) a firefly. According to at least one embodiment, a method for determining whether a pixel of a computer-rendered image is a firefly includes: dividing a plurality of samples originating from the pixel, into a first subset of samples and a second subset of samples; and first identifying whether the pixel is an outlier based on statistical variance data of the first subset of samples. The method further includes second identifying whether the pixel is an outlier based on statistical variance data of the second subset of samples. The method further includes determining that the pixel is not a firefly in response to both the pixel being first identified as an outlier based on the statistical variance data of the first subset of samples, and the pixel being second identified as an outlier based on the statistical variance data of the second subset of samples. The method further includes determining that the pixel is a firefly in response to either (i) the pixel being not first identified as an outlier based on the statistical variance data of the first subset of samples and being second identified as an outlier based on the statistical variance data of the second subset of samples, or (ii) the pixel not being second identified as an outlier based on the statistical variance data of the second subset of samples and being first identified as an outlier based on the statistical variance data of the first subset of samples.

According to at least one embodiment, a machine-readable non-transitory medium storing machine-executable instructions for determining whether a pixel of a computer-rendered image is a firefly is disclosed. The instructions include: dividing a plurality of samples originating from the pixel, into a first subset of samples and a second subset of samples; first identifying whether the pixel is an outlier based on statistical variance data of the first subset of samples; second identifying whether the pixel is an outlier based on statistical variance data of the second subset of samples; determining that the pixel is not a firefly in response to both the pixel being first identified as an outlier based on the statistical variance data of the first subset of samples, and the pixel being second identified as an outlier based on the statistical variance data of the second subset of samples; and determining that the pixel is a firefly in response to either (i) the pixel being not first identified as an outlier based on the statistical variance data of the first subset of samples and being second identified as an outlier based on the statistical variance data of the second subset of samples, or (ii) the pixel not being second identified as an outlier based on the statistical variance data of the second subset of samples and being first identified as an outlier based on the statistical variance data of the first subset of samples.

According to at least one embodiment, a system for determining whether a pixel of a computer-rendered image is a firefly includes one or more controllers configured to: divide a plurality of samples originating from the pixel, into a first subset of samples and a second subset of samples; first identify whether the pixel is an outlier based on statistical variance data of the first subset of samples; second identify whether the pixel is an outlier based on statistical variance data of the second subset of samples; determine that the pixel is not a firefly in response to both the pixel being first identified as an outlier based on the statistical variance data of the first subset of samples, and the pixel being second identified as an outlier based on the statistical variance data of the second subset of samples; and determine that the pixel is a firefly in response to either (i) the pixel being not first identified as an outlier based on the statistical variance data of the first subset of samples and being second identified as an outlier based on the statistical variance data of the second subset of samples, or (ii) the pixel not being second identified as an outlier based on the statistical variance data of the second subset of samples and being first identified as an outlier based on the statistical variance data of the first subset of samples.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in the technological field of computer animation and other computer modeling applications that other embodiments may be utilized, and that structural, electrical, as well as procedural changes may be made without departing from the scope of the present invention. Wherever possible, the same reference numbers will be used throughout the drawings to refer to the same or similar parts.

According to one approach, fireflies are eliminated from computer graphics via nonlinear median and alpha-trimmed mean filters. According to another approach, fireflies are removed in the context of a denoising algorithm, not as a stand-alone pass, but by using a median filter over the image to remove extreme values from the pixel data. In a similar manner, fireflies are removed prior to denoising by checking RGB values of neighboring pixels in a 3×3 block and using a median value to replace a center pixel if the RGB value of the center pixel is more than two standard deviations away from a mean value. To reduce the quantity of fireflies in an energy-preserving manner, filter kernel widths may be dynamically adjusted while samples are added to the rendered image buffer based on previous values. To remove outlying samples at a render time, an alpha-trimmed mean analysis may be used.

Instead of removing fireflies explicitly, one approach avoids artifacts in denoising by applying a logarithmic scale to glossy and specular inputs before denoising. Accordingly, the quantity of ringing artifacts may be reduced in several denoising algorithms.

According to embodiments of the present disclosure, a plurality of buffers are used to detect fireflies and, more specifically, to reduce the number of false positives when potential fireflies are identified. For example, a plurality of buffers are used to determine if a bright pixel is either a random firefly caused by a low-probability event, or merely a legitimate highlight (e.g., an expected highlight).

For purposes of illustration, various embodiments will be described below with reference to using half buffers that are generated by dividing a plurality of image samples into two buffers. However, it is understood that features described herein can also apply to buffers generated by dividing the plurality of image samples into three or more buffers. Based on the number (e.g., quantity) of image samples, increasing the number of buffers that are used may effectively reduce the number of false positives.

Figure 1A:
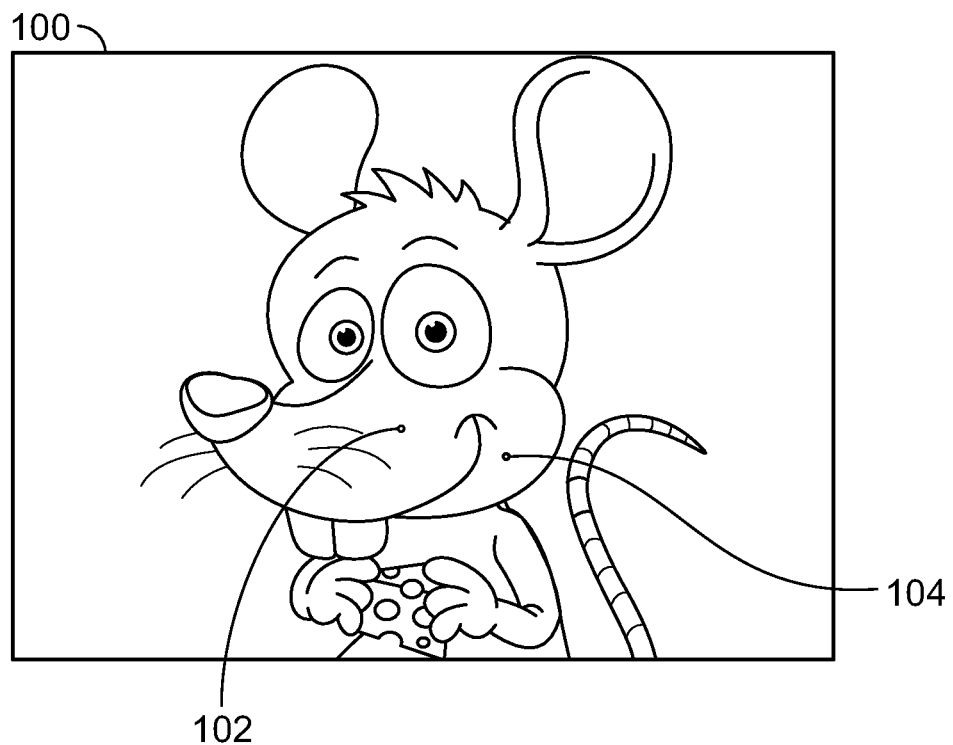
FIGS. 1A and 1B illustrate examples of a rendered image.
Figure 1B:
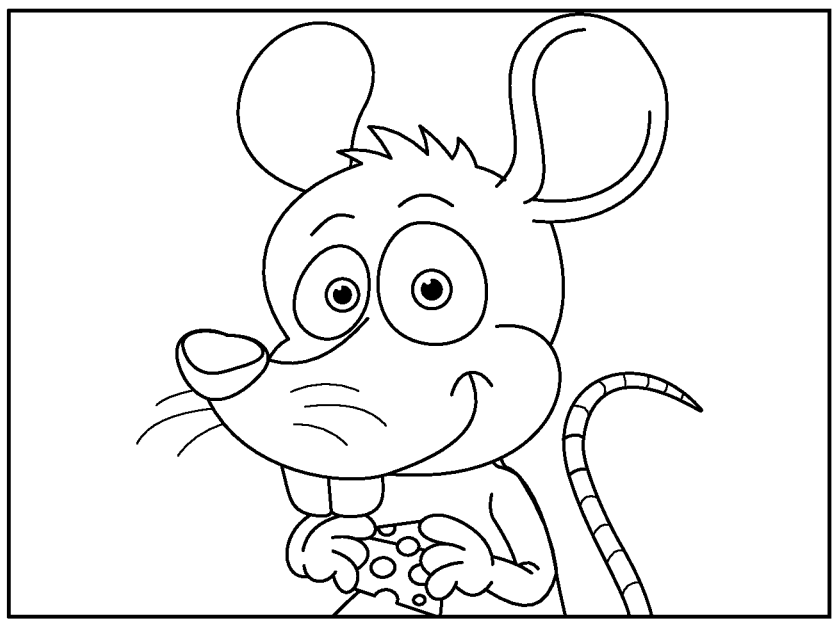
Figure 2A:
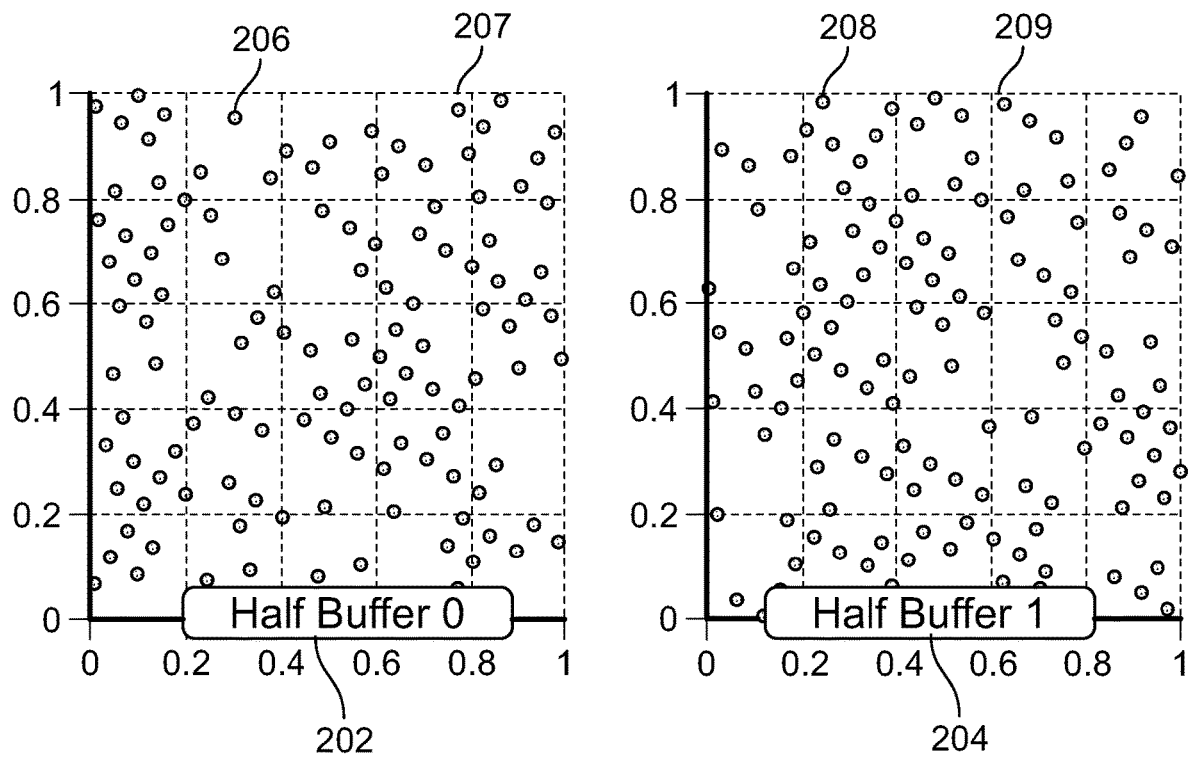
FIG. 2A illustrates examples of sample placements in half buffers generated by dividing a plurality of image samples into two buffers.

FIG. 2A illustrates examples of sample placements in half buffers generated by dividing a plurality of image samples into two buffers (e.g., assigning each image sample to either a first buffer or a second buffer). An individual pixel has a certain number of image samples (or samples). In the context of computer graphics, a sample represents an intersection of a channel and pixel. For example, a 24-bit pixel may consist of 3 samples: a Red sample that occupies 9 bits; a Green sample that occupies 7 bits; and a Blue sample that occupies 8 bits. According to other examples (e.g., situations involving high-dynamic range images), each red, green, or blue channel is represented by a separate floating point value instead of an integer. These floating point values can be half precision (16 bits), single precision (32 bits), or double precision (64 bits).

The dimensions of the x- and y-axes in FIG. 2A are unitless. The illustrated areas are areas between a pixel and its neighbors. If pixels are considered as discrete, uniform points over a continuous plane, then the pixel is the center of the area (e.g., at the (x,y) location of (0.5, 0.5)). In general, sample points are generated in the range of [0, 1) (i.e., inclusive of 0, exclusive of 1). However, this range may be modified as needed by the renderer.

With reference to FIG. 2A, samples of an individual pixel are divided into half buffers 202 and 204. That is, each sample of the individual pixel is either assigned to half buffer 202 or assigned to half buffer 204. For example, FIG. 2A illustrates that samples 206 and 207 of the individual pixel are assigned to the half buffer 202, and that samples 208 and 209 of the same pixel are assigned to the half buffer 204. In one example, the samples of the individual pixel may be equally divided in generating the half buffers 202 and 204. In this example, with respect to the individual pixel, half buffers 202 and 204 each contains exactly half of the samples for the individual pixel that are used to produce a final image.

According to at least one embodiment, the half buffers 202 and 204 are generated such that each half buffer includes a suitably random distribution of samples. For example, each of the half buffers 202, 204 includes samples that, in the aggregate, provide meaningful coverage for a complete pixel, rather than coverage of only specific regions (e.g., localized regions) for the pixel.

An image produced by the samples of the half buffer 202 and an image produced by the samples of the half buffer 204 may vary in noise patterns. Such images may be considered as noisier versions of a final image that would result, for example, by averaging together the samples of the half buffer 202 and the samples of the half buffer 204.

According to embodiments of the present disclosure, the variance of an individual pixel is used to detect fireflies. Variance effectively measures how far a set of random numbers are spread out from a corresponding average value. As described earlier with reference to FIG. 2A, an individual pixel has a certain number of image samples (or samples). The variance of the pixel effectively measures how far the samples are spread out from a corresponding average value. The greater the degree to which the samples are spread out, the higher the variance.

Figure 2B:
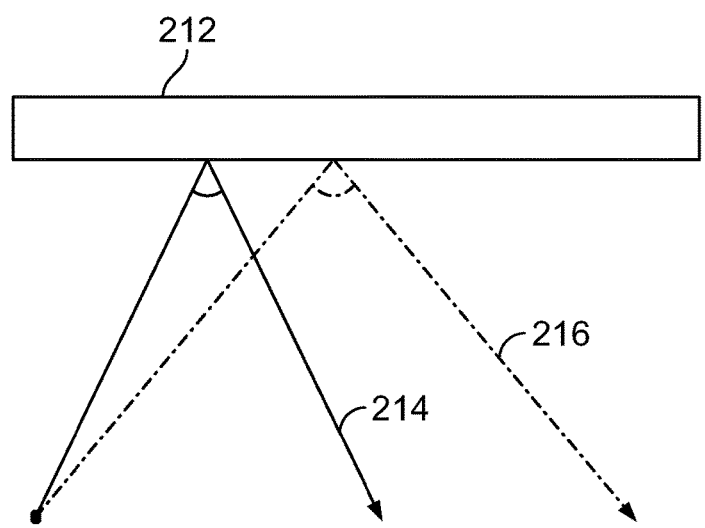
FIG. 2B illustrates examples of specular rays from a pixel.

FIG. 2B illustrates examples of specular rays from a pixel. Although specular rays 214 and 216 originate from a same pixel 212, the specular rays 214 and 216 result in significantly different radiance values. The high variance (e.g., between specular samples) can lead to incorrectly classifying highlights as fireflies.

Figure 3:
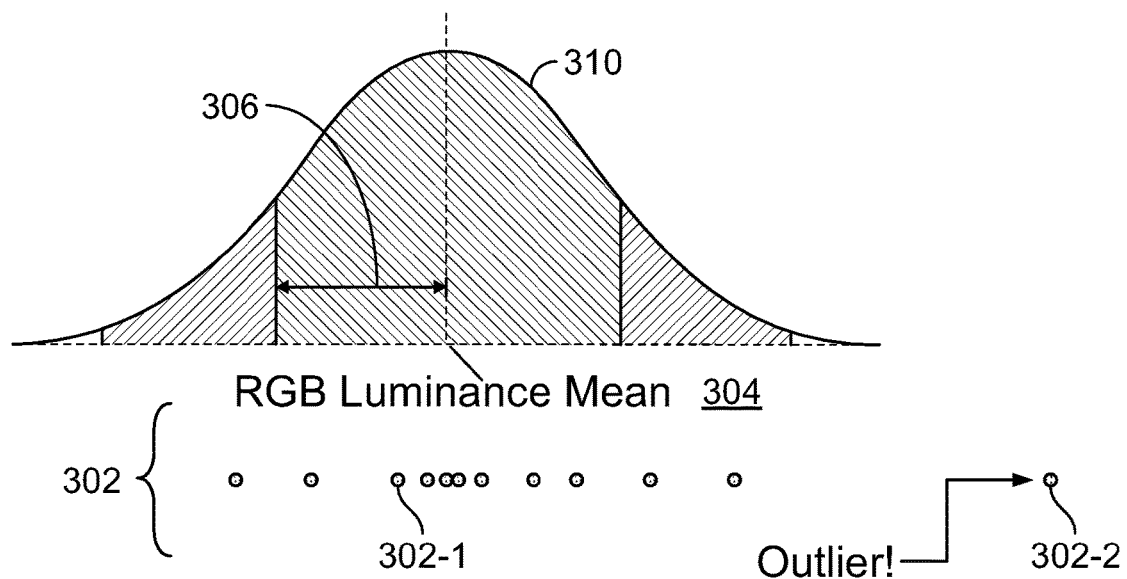
FIG. 3 illustrates an example distribution of samples of an individual pixel.

FIG. 3 illustrates an example distribution of samples 302 of an individual pixel. As illustrated in FIG. 3, the samples 302 generally have a normal distribution 310, centered about an average RGB luminance mean value 304. A significant number of the samples 302 (including a sample 302-1) are located within a standard deviation 306 of the mean value 304. However, not all of the samples 302 are so located. In particular, a sample 302-2 is located significantly outside the standard deviation 306 of the mean value 304. For example, the location of the sample 302-2 may be sufficiently different from what is expected, such that it is considered to be an outlier. The presence of the sample 302-2 in the samples 302 increases the variance of the individual pixel.

Figure 4:
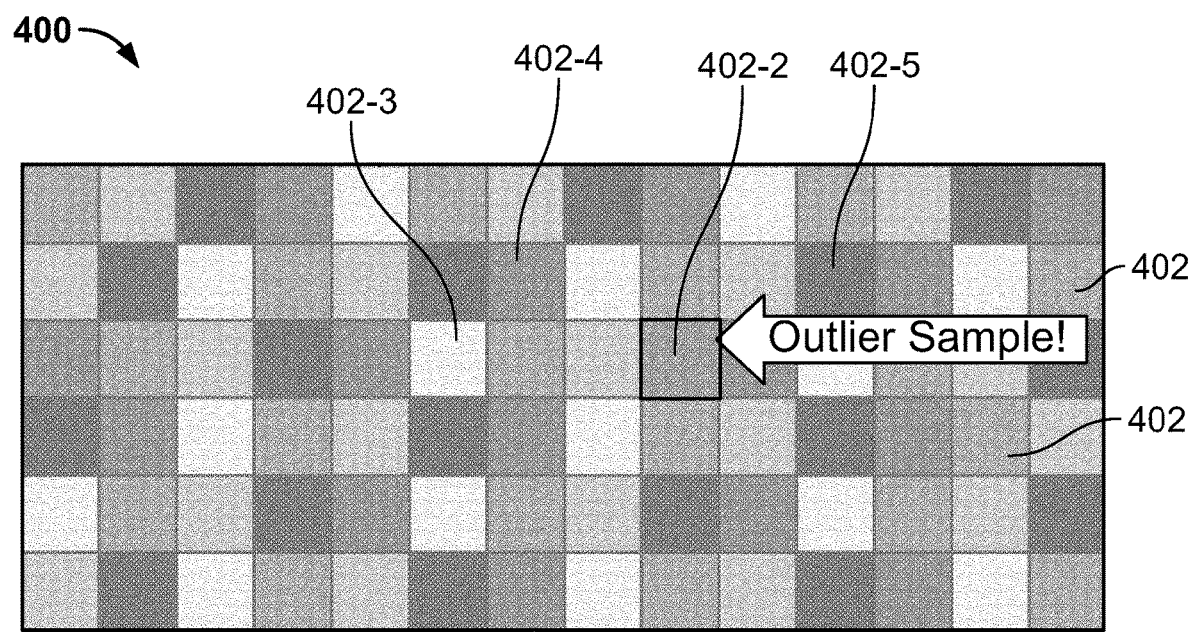
FIG. 4 illustrates an example of pixels of a rendered image.

FIG. 4 illustrates an example of pixels 402 of a rendered image 400. The image 400 includes pixels 402. Each of the pixels 402 has a corresponding set of samples (e.g., samples 302). With regard to the samples for a given one of the pixels 402, variance information is available for the given pixel. As illustrated in FIG. 4, pixel 402-2 is identified as an outlier. The pixel 402-2 is identified as an outlier, for example, because it has a sample (or at least one sample) having a value that is sufficiently different from what is expected (see, e.g., sample 302-2). The presence of such a sample causes the variance of the pixel 402-2 to increase. As such, the variance of the pixel 402-2 may be an outlier with respect to neighboring pixels (e.g., pixels 402-3, 402-4, 402-5).

In at least some respects, the variance data provide a better basis for identifying outliers than color channels data provide. For example, some pixels in an image are expected to be much brighter than other pixels in the image. However, the expectedly brighter pixels do not necessarily represent a firefly. Rather, they may merely represent an expected and fully-converged difference in color.

According to at least one embodiment, outliers are identified using a Generalized Extreme Studentized Deviate (ESD) Test for Outliers.

The Generalized ESD Test is more robust than tests that compare values of standard deviation, and, unlike other outlier tests, does not require knowing the exact number (e.g., a suspected number) of outliers beforehand. However, this test may require an upper bound for the suspected number of outliers. Estimation of the upper bound will be described in more detail later. According to various embodiments, outlier detection is more effective if the square root of the variance is taken to convert the variance to the standard deviation, or if the logarithm of the variance is taken.

The Generalized ESD Test may be applied to a large sample size corresponding to the entire set of pixels for an image. However, the general nature of rendering, with its discontinuities and non-identically-distributed samples, does not necessarily create a normal distribution of samples, which the Generalized ESD Test assumes. For example, a rendered image may depict a first object and a second object. The first object generates high pixel variance samples, and the second object which generates low pixel variance samples. Fireflies can be produced in both objects. However, when a normal distribution is assumed, the relatively noise-free section of the image (e.g., the second object) may appear to have no fireflies when compared to the high-variance section of the image (e.g., the first object).

Figure 5:
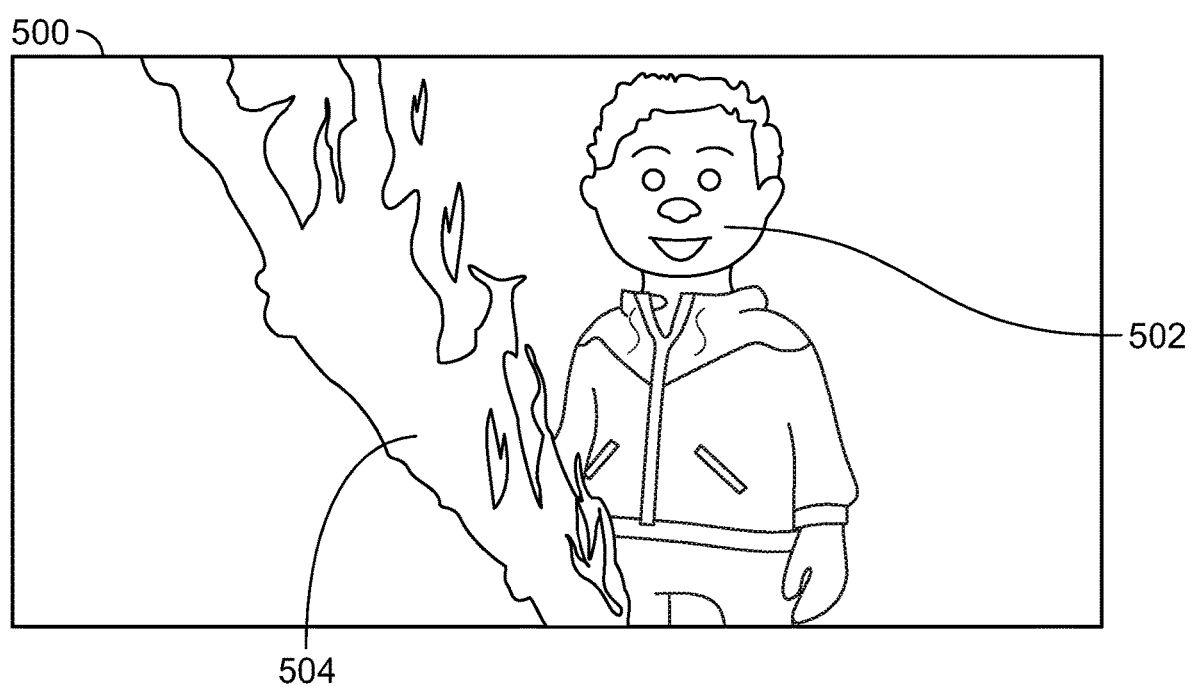
FIG. 5 illustrates an example of a rendered image.

An example of such a situation will now be described with reference to FIG. 5, which illustrates an example of a rendered image 500. The rendered image 500 depicts a flaming sword 504 and a face 502 of a person. The sword 504 generates high pixel variance samples, and the face 502 generates low pixel variance samples. It is possible that fireflies are produced in both the sword 504 and the face 502. However, when a normal distribution is assumed, the relatively noise-free section of the image (e.g., the face 502) may appear to have no fireflies when compared to the high-variance section of the image (e.g., the sword 504).

As such, applying the Generalized ESD Test to the entire set of pixels of the image 500, as a whole, may be problematic in that outliers on the sword 504 may dominate, causing fireflies on the face 502 not to be identified (e.g., for removal and/or further processing). For example, when the image 500 is considered as a whole, the outliers on the sword 504 may be so overwhelming, as to make any outliers on the face 502 appear to fall within a normal range.

According to embodiments of the present disclosure, evaluations (e.g., applications of the Generalized ESD Test) are performed in smaller (e.g., more localized) regions around each pixel (or at least each of some pixels). This may result in a distribution of data that is closer to a normal distribution, thereby better facilitating the detection of outliers in the localized region, but at the cost of having a reduced sample size from which to work. Here, the phrase "sample size" refers to the number of pixels from which data is used in a particular evaluation.

The sample size that is used may be determined based on multiple considerations. For example, if the sample size is too small, the underlying data may be insufficient to achieve statistical confidence. On the other hand, if the sample size is too large, then issues relating to discontinuities and non-normally-distributed data may arise. It is more likely that variance data will have (or more closely resemble) a normal distribution in a smaller region where discontinuities do not appear.

According to at least one embodiment, the sample size is selected to be greater than or equal to 15 pixels. Critical values in the Generalized ESD Test have been determined to be accurate for sample sizes greater than or equal to 15 pixels.

According to at least one further embodiment, the sample size is selected to be greater than or equal to 25 pixels. Critical values in the Generalized ESD Test were determined to be very accurate for sample sizes greater than or equal to 25 pixels.

For purposes of illustration, embodiments employing a sample size of 25 pixels will be described in more detail below. However, it is understood that features described with reference to such embodiments may also be applicable when using smaller sample sizes (e.g., sample sizes between 15 and 25 pixels) or larger sample sizes (e.g., sample sizes larger than 25 pixels).

Embodiments employing sample sizes of 25 pixels (e.g., pixel regions of 5×5 pixels) will now be described with reference to FIGS. 6A, 6B, 6C, 6D, 6E, 6F, 6G and 6H.

Figure 6A:
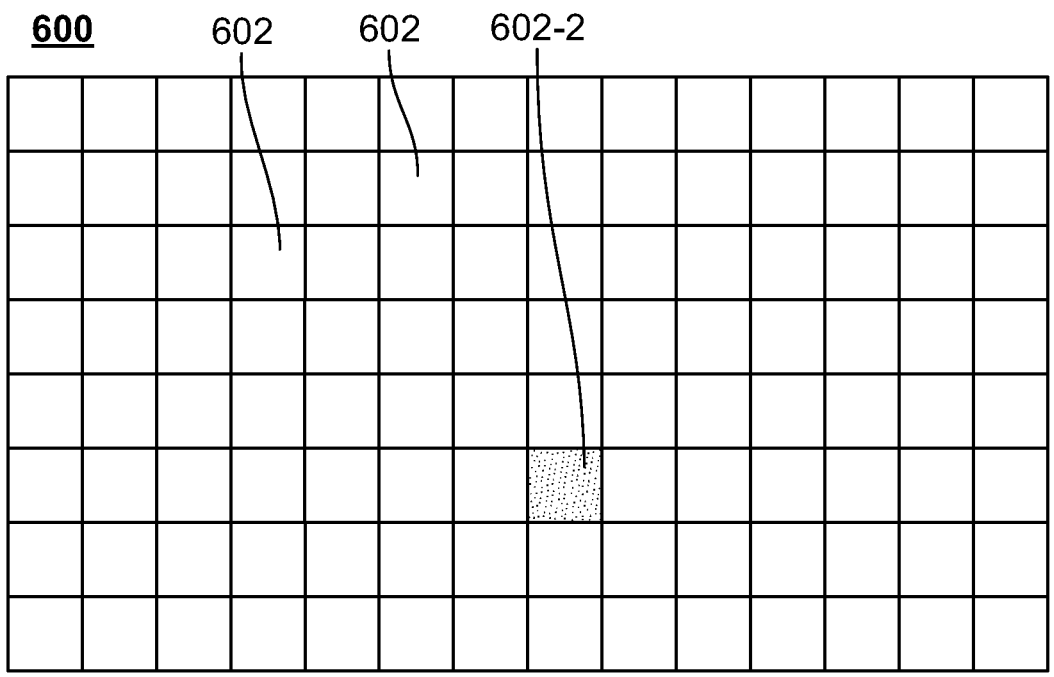
FIGS. 6A, 6B, 6C, 6D, 6E, 6F, 6G and 6H illustrate employing moving pixel regions according to at least one embodiment.

FIG. 6A illustrates an array of pixels 602 of a portion 600 of a rendered image. It is determined whether a pixel 602-2 contains a potential firefly. According to at least one embodiment, it is determined that the pixel 602-2 contains a potential firefly if the pixel 602-2 is identified as an outlier within 25 different pixel regions.

Figure 6B:
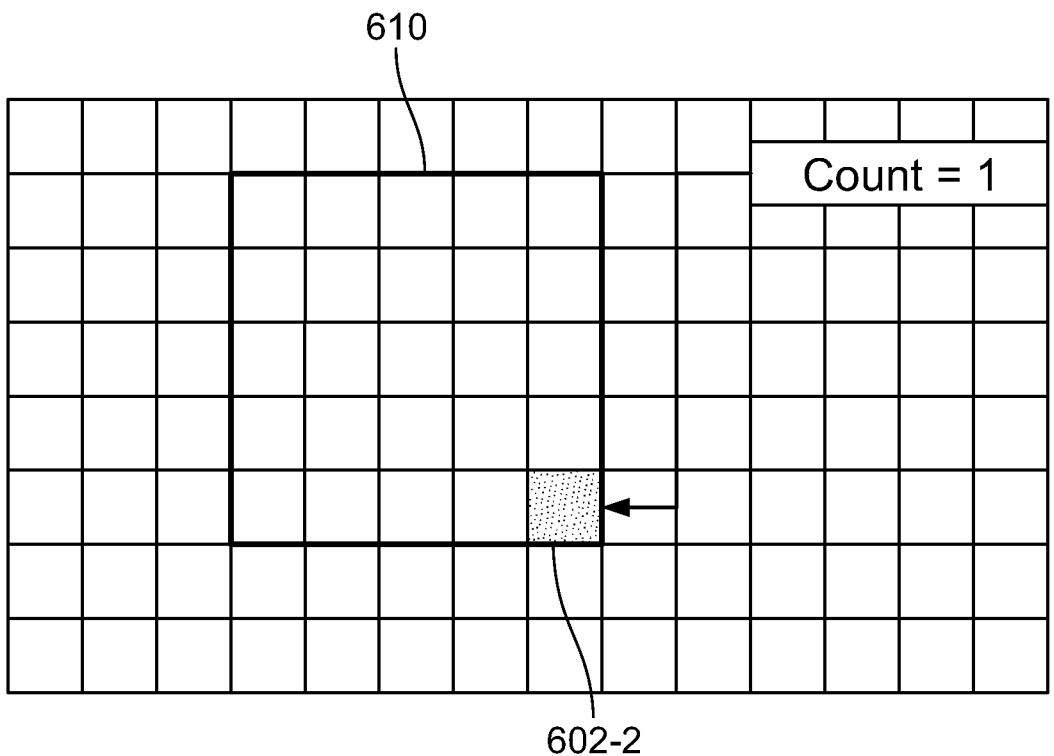

For example, with reference to FIG. 6B, the Generalized ESD Test is applied to pixels within a pixel region 610. The pixel region 610 includes the pixel 602-2 and 24 other pixels that are in the vicinity of the pixel 602-2. As illustrated in FIG. 6B, the pixel 602-2 is located at the bottom-right corner of the pixel region 610.

The Generalized ESD Test is applied to pixel variance data of the 25 pixels that are within the pixel region 610. Then, if it is determined that the pixel 602-2 is an outlier with respect to the 25 pixels within the pixel region 610, a counter is incremented. Otherwise, the counter is not incremented. For example, with reference to FIG. 6B, it is determined that the pixel 602-2 is an outlier with respect to the 25 pixels within the pixel region 610, and a counter is incremented (e.g., to have a value of 1). Next, it is determined whether the pixel 602-2 is an outlier with respect to a different pixel region.

Figure 6C:
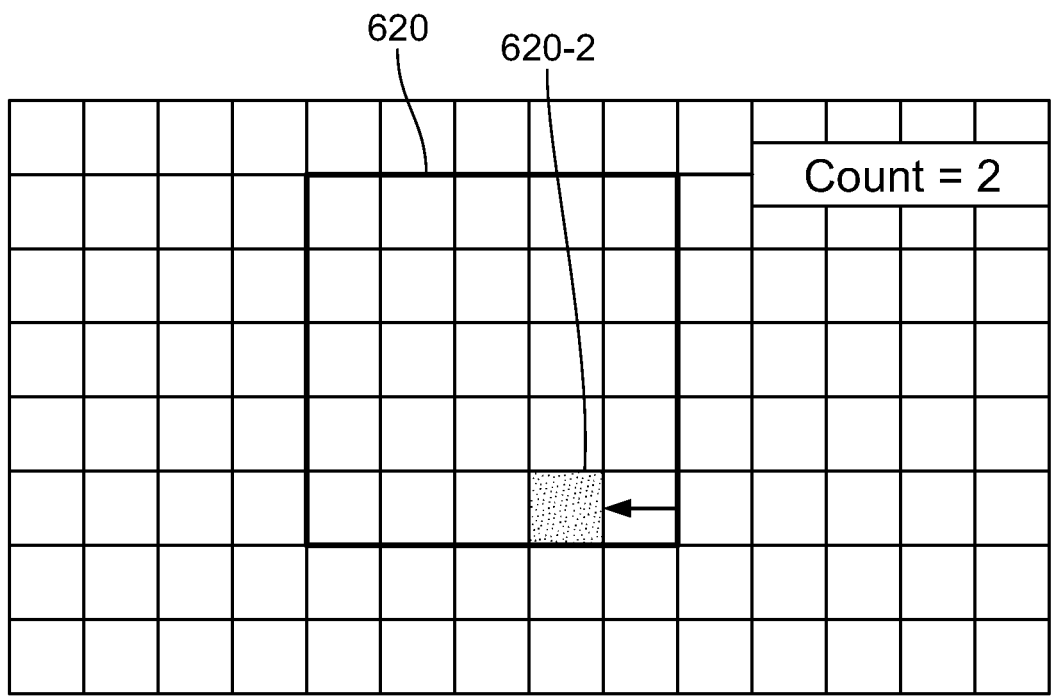

For example, with reference to FIG. 6C, the Generalized ESD Test is applied to pixels within a pixel region 620. The pixel region 620 includes the pixel 602-2 and 24 other pixels that are in the vicinity of the pixel 602-2. The pixel region 620 is similar to the pixel region 610 of FIG. 6B. However, relative to the pixel region 610, the position of the pixel region 620 is shifted towards the right by the width of 1 pixel.

The Generalized ESD Test is applied to pixel variance data of the 25 pixels that are within the pixel region 620. Then, if it is determined that the pixel 602-2 is an outlier with respect to the 25 pixels within the pixel region 620, the counter is incremented. Otherwise, the counter is not incremented. For example, with reference to FIG. 6C, it is determined that the pixel 602-2 is an outlier with respect to the 25 pixels within the pixel region 620, and the counter is incremented (e.g., to have a value of 2). Next, it is determined whether the pixel 602-2 is an outlier with respect to a different pixel region.

Figure 6D:
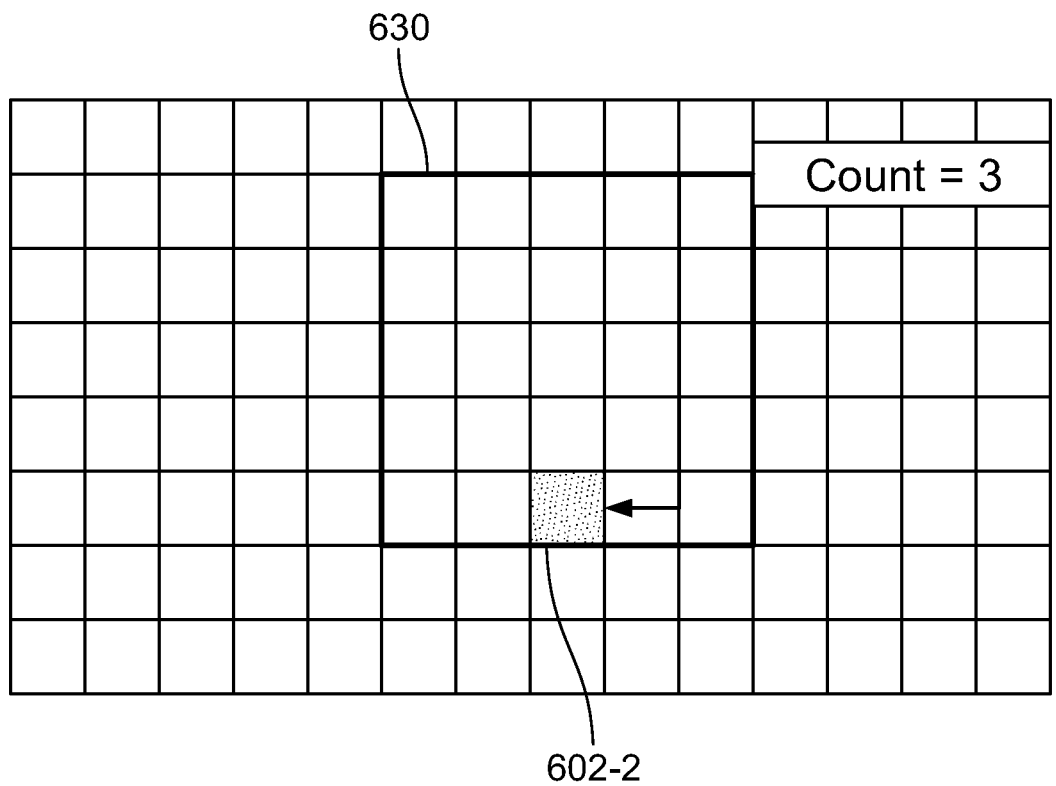

For example, with reference to FIG. 6D, the Generalized ESD Test is applied to pixels within a pixel region 630. The pixel region 630 includes the pixel 602-2 and 24 other pixels that are in the vicinity of the pixel 602-2. The pixel region 630 is similar to the pixel region 620 of FIG. 6C. However, relative to the pixel region 620, the position of the pixel region 630 is shifted towards the right by the width of 1 pixel.

The Generalized ESD Test is applied to pixel variance data of the 25 pixels that are within the pixel region 630. Then, if it is determined that the pixel 602-2 is an outlier with respect to the 25 pixels within the pixel region 630, the counter is incremented. Otherwise, the counter is not incremented. For example, with reference to FIG. 6D, it is determined that the pixel 602-2 is an outlier with respect to the 25 pixels within the pixel region 630, and the counter is incremented (e.g., to have a value of 3). Next, it is determined whether the pixel 602-2 is an outlier with respect to a different pixel region.

Figure 6E:
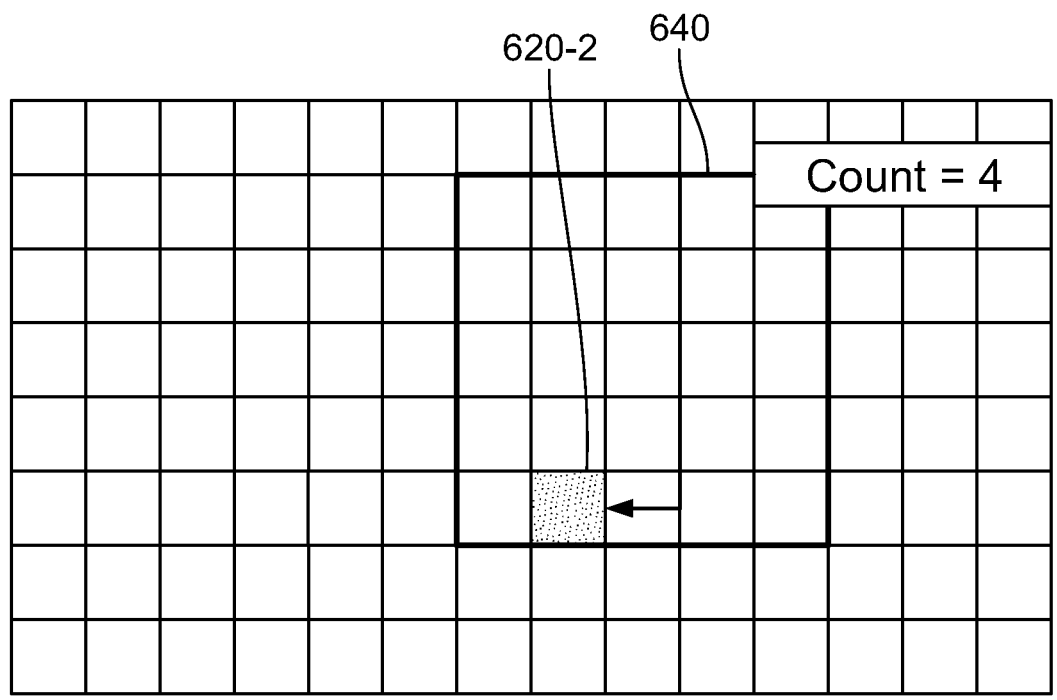

For example, with reference to FIG. 6E, the Generalized ESD Test is applied to pixels within a pixel region 640. The pixel region 640 includes the pixel 602-2 and 24 other pixels that are in the vicinity of the pixel 602-2. The pixel region 640 is similar to the pixel region 630 of FIG. 6D. However, relative to the pixel region 630, the position of the pixel region 640 is shifted towards the right by the width of 1 pixel.

The Generalized ESD Test is applied to pixel variance data of the 25 pixels that are within the pixel region 640. Then, if it is determined that the pixel 602-2 is an outlier with respect to the 25 pixels within the pixel region 640, the counter is incremented. Otherwise, the counter is not incremented. For example, with reference to FIG. 6E, it is determined that the pixel 602-2 is an outlier with respect to the 25 pixels within the pixel region 640, and the counter is incremented (e.g., to have a value of 4). Next, it is determined whether the pixel 602-2 is an outlier with respect to a different pixel region.

Figure 6F:
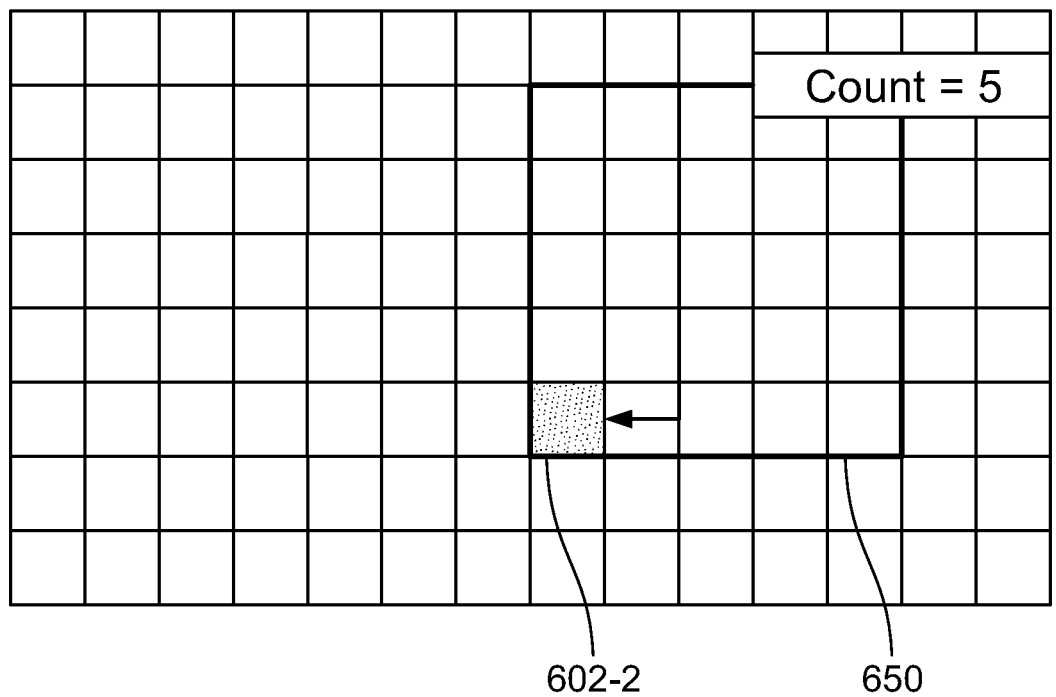

For example, with reference to FIG. 6F, the Generalized ESD Test is applied to pixels within a pixel region 650. The pixel region 650 includes the pixel 602-2 and 24 other pixels that are in the vicinity of the pixel 602-2. As illustrated in FIG. 6F, the pixel 602-2 is located at the bottom-left corner of the pixel region 650. The pixel region 650 is similar to the pixel region 640 of FIG. 6E. However, relative to the pixel region 640, the position of the pixel region 650 is shifted towards the right by the width of 1 pixel.

The Generalized ESD Test is applied to pixel variance data of the 25 pixels that are within the pixel region 650. Then, if it is determined that the pixel 602-2 is an outlier with respect to the 25 pixels within the pixel region 650, the counter is incremented. Otherwise, the counter is not incremented. For example, with reference to FIG. 6F, it is determined that the pixel 602-2 is an outlier with respect to the 25 pixels within the pixel region 650, and the counter is incremented (e.g., to have a value of 5). Next, it is determined whether the pixel 602-2 is an outlier with respect to a different pixel region.

Figure 6G:
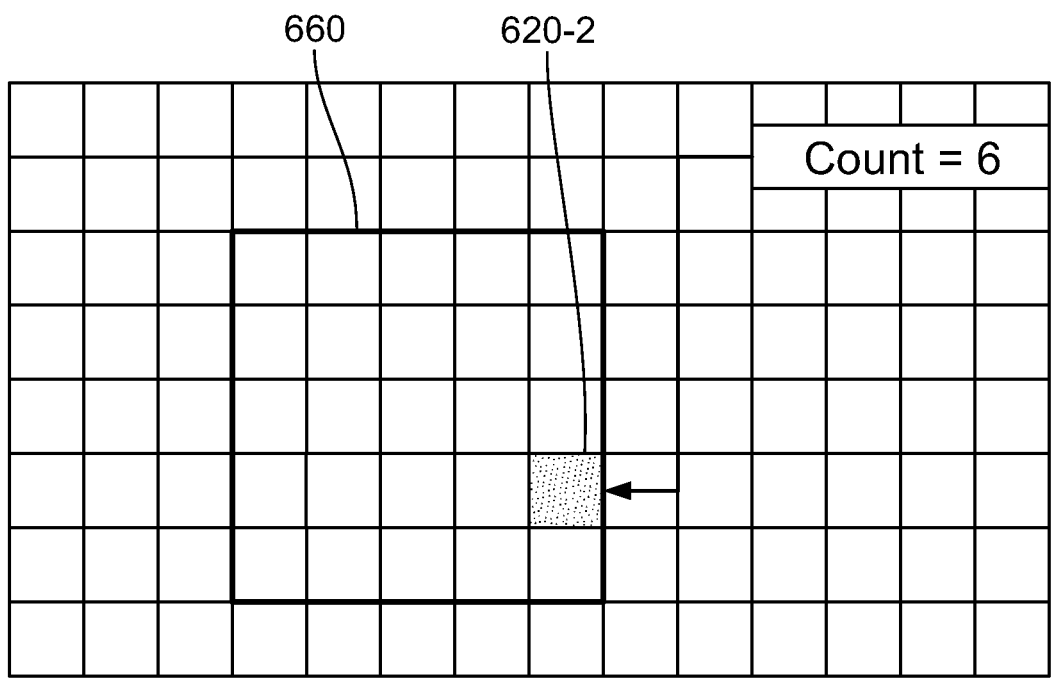

For example, with reference to FIG. 6G, the Generalized ESD Test is applied to pixels within a pixel region 660. The pixel region 660 includes the pixel 602-2 and 24 other pixels that are in the vicinity of the pixel 602-2. The pixel region 660 is similar to the pixel region 610 of FIG. 6B. However, relative to the pixel region 610, the position of the pixel region 660 is shifted towards the bottom by the height of 1 pixel.

The Generalized ESD Test is applied to pixel variance data of the 25 pixels that are within the pixel region 660. Then, if it is determined that the pixel 602-2 is an outlier with respect to the 25 pixels within the pixel region 660, the counter is incremented. Otherwise, the counter is not incremented. For example, with reference to FIG. 6G, it is determined that the pixel 602-2 is an outlier with respect to the 25 pixels within the pixel region 660, and the counter is incremented (e.g., to have a value of 6). Next, it is determined whether the pixel 602-2 is an outlier with respect to a different pixel region.

Figure 6H:
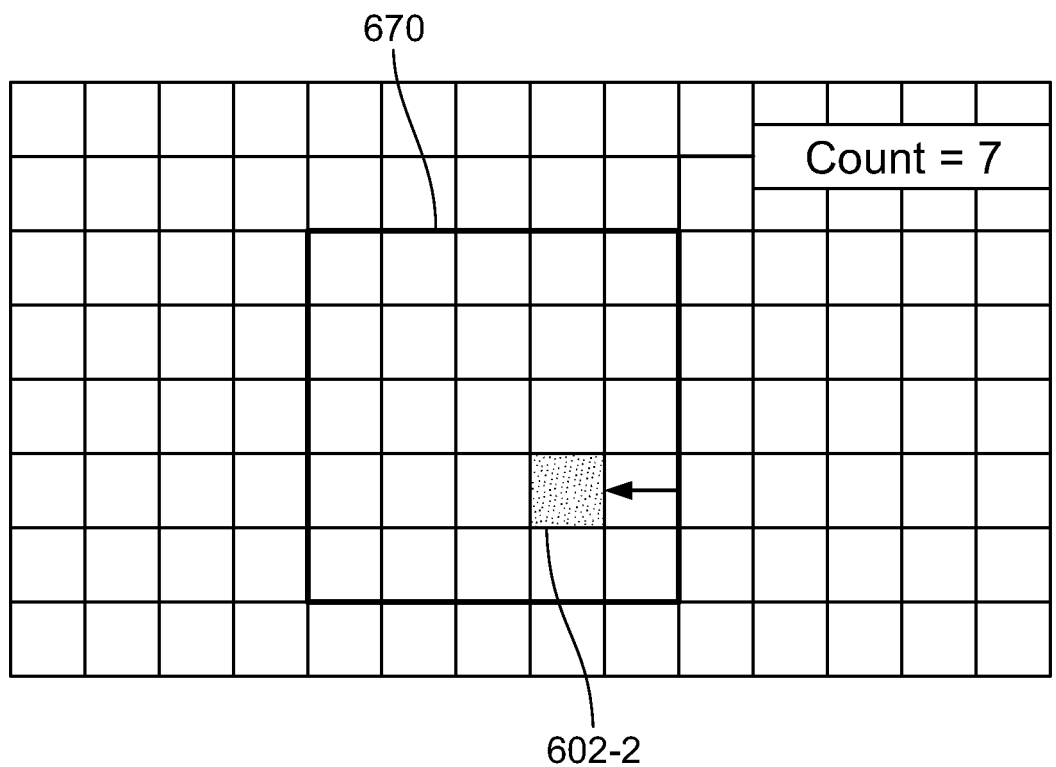

For example, with reference to FIG. 6H, the Generalized ESD Test is applied to pixels within a pixel region 670. The pixel region 670 includes the pixel 602-2 and 24 other pixels that are in the vicinity of the pixel 602-2. The pixel region 670 is similar to the pixel region 660 of FIG. 6G. However, relative to the pixel region 660, the position of the pixel region 670 is shifted towards the right by the width of 1 pixel.

The Generalized ESD Test is applied to pixel variance data of the 25 pixels that are within the pixel region 670. Then, if it is determined that the pixel 602-2 is an outlier with respect to the 25 pixels within the pixel region 670, the counter is incremented. Otherwise, the counter is not incremented. For example, with reference to FIG. 6H, it is determined that the pixel 602-2 is an outlier with respect to the 25 pixels within the pixel region 670, and the counter is incremented (e.g., to have a value of 7). Next, it is determined whether the pixel 602-2 is an outlier with respect to a different pixel region.

The application of the Generalized ESD Test is then applied in a similar manner for each of the remaining 18 pixel regions, such that there is a total of 25 separate determinations of whether the pixel 602-2 is an outlier. In each determination, the counter is incremented if the pixel 602-2 is an outlier.

According to at least one embodiment, a particular pixel (e.g., pixel 602-2) is identified as a potential firefly if the value of the counter is greater than or equal to a particular threshold. For example, according to a particular embodiment, the pixel 602-2 is identified as a potential firefly if the value of the counter is greater than or equal to 25. In this situation, the pixel 602-2 is identified as a potential firefly if the pixel 602-2 is unanimously determined to be an outlier in each and every of the 25 pixel regions. Based on this framework of unanimous voting, any one particular pixel region (e.g., pixel region 610, 620, 630, 640, 650, 660 or 670) can effectively veto the identification of a particular pixel as a potential firefly. For example, any one particular pixel region can effectively veto such an identification if it is determined that the variance data of the particular pixel sufficiently fits within the variance data of the particular pixel region. As such, the number of false positives may be reduced when, for example, a number of high-variance pixels neighbor a number of low-variance pixels (see, e.g., FIG. 5).

Various embodiments have been described, by way of example, with reference to employing 25 different pixel regions for a particular pixel, where each pixel region has dimensions of 5×5 pixels. In this regard, it is understood that, based on the positioning or location of a pixel in a rendered image, fewer than 25 different pixel regions may be employed. For example, a pixel located near the edge (or periphery) of a rendered image may be included in a correspondingly smaller number pixel regions. In this situation, pixel regions having dimensions of 4×4 pixels or 3×3 pixels, by way of example. Also, the particular pixel is identified as a potential firefly if the value of the incremented counter is greater than or equal to 16 or 9, for example.

For a particular pixel (e.g., pixel 602-2), the identification that has been described with reference to FIGS. 6B to 6H may be performed based on a first subset of samples (see, e.g., the samples of half buffer 202). Independent of that identification, a separate, but similar, identification may be performed based on a second subset of samples (see, e.g., the samples of half buffer 204). Using half buffers in such a manner may provide additional insights into whether a bright pixel results from an unwanted artifact or from an expected highlight (e.g., corresponding to a specular or glossy surface).

After the identification in the first subset and the identification in the second subset have been performed, then image reconstruction may begin.

For example, according to at least one embodiment, removal of fireflies is performed. Here, an outlier identified in the first subset is removed and saved elsewhere (e.g., in a separate buffer). Similarly, an outlier identified in the second subset is removed and saved elsewhere (e.g., in a separate buffer). The mean of the two resulting subsets is used to form the basis of a resulting image (e.g., final image).

If an outlier is identified in only one subset (e.g., the half buffer 202, but not the half buffer 204; or the half buffer 204, but not the half buffer 202), then it is concluded that the identified outlier corresponds to a random rendering artifact. In other words, it is concluded that the identified outlier is a firefly. As such, the identified outlier is effectively discarded, and effectively replaced with image information from the other subset. Alternatively, the image (e.g., the pixel) is reconstructed as will be described in more detail later.

For example, if an outlier is identified in the half buffer 202, but not the half buffer 204, then it is concluded that the identified outlier corresponds to a random rendering artifact. In other words, it is concluded that the identified outlier is a firefly. As such, the identified outlier in the half buffer 202 is effectively discarded, and effectively replaced with image information from the half buffer 204. Alternatively, the image (e.g., the pixel) is reconstructed as will be described in more detail later.

On the other hand, if an outlier is identified in both subsets, then it is concluded that the identifier outliers do not result from a random firefly. Rather, it is concluded that the identified outliers correspond to an expected value (e.g., an expected, or legitimate, highlight) having high variance. As such, the mean of the outliers (which had been removed and saved elsewhere) is generated and returned to produce the final image.

For example, if an outlier is identified in the half buffer 202 and in the half buffer 204, then it is concluded that the identifier outliers do not result from a random firefly. Rather, it is concluded that the identified outliers correspond to a value that is expected (e.g., an expected, or legitimate, highlight) having high variance. As such, the mean of the outliers (which had been removed and saved elsewhere) is generated and returned to produce the final image.

Accordingly, removal of fireflies is performed, according to at least one embodiment. According to at least one further embodiment, removal of fireflies is followed by a denoising of the resulting image. In this regard, pixels themselves are denoised before being added back into the output color data. For this purpose, plausible data from which denoising filters can draw may be sought. As noted earlier, denoising may include using a median filter over an image to remove extreme values from the pixel data. In contrast, the detection of fireflies, according to embodiments disclosed herein, includes performing separate identifications based on separate sets of variance data. For example—for a particular pixel (e.g., pixel 602-2), a first identification (see, e.g., FIGS. 6B to 6H) is performed based on variance information obtained from a first subset of image samples e.g., the image samples of half buffer 202). In addition, a second identification (see, e.g., FIGS. 6B to 6H) is performed based on variance information obtained from a second subset of image samples e.g., the image samples of half buffer 204). According to various embodiments, a determination of whether an identified outlier is a firefly is based on these identifications.

If it was concluded that the identified outlier corresponds to a random rendering artifact (e.g., it was concluded that the identified outlier is a firefly), then the image information from the other subset (e.g., the subset in which an outlier was not identified) or image information from reconstruction is used for denoising purposes.

If it was concluded that the identified outliers correspond to an expected value (e.g., an expected, or legitimate, highlight), then the mean of the outliers (which had been removed and saved elsewhere) is used for denoising purposes. In this situation, color and variance data may be reconstructed. For example, both the color data and the outliers may be denoised in separate passes.

In general, any gaps may be filled in with filtering (e.g., Gaussian filtering, truncated sinc filtering, box filtering) of neighboring pixels. Other outliers may be skipped in the filtering. It is possible that a particular pixel that is being filtered is located among other outliers. In this situation, data from which to draw or fill in may not be available. Here, a list of unfilled pixels may be created. The list is iterated over until every pixel is filled in. Further random iterations are performed until converged values are obtained.

As disclosed earlier, the Generalized ESD Test may require an upper bound (e.g., an upper bound for the suspected number of outliers). Setting an upper bound (e.g., the upper bound for the suspected number of outliers) to be equal to the number of pixels (e.g., the number of pixels in a pixel region) may be prohibitively slow for large regions, and can lead to precision problems as the run-time statistics are modified. Therefore, estimating a tighter upper bound may be worthwhile. According to one or more embodiments, a modified Z-score is used to estimate the upper bound. Assuming that the image may not be the complete (or final) image, black pixels may be ignored when estimating the upper bound. The alpha channel can also be used to further rule out pixels.

$$\langle I \rangle \approx \frac{1}{N} \sum_{i=1}^{N} \frac{f(\overline{x}_i)}{p(\overline{x}_i)} \quad (1)$$

Equation 1 above present the importance-sampling Monte Carlo estimator of the integral $I=\int_{106} f(\overline{x})d\overline{x}$ given N samples and a probability density function $p(\overline{x})$ from which to draw the samples. As an example of the origin of fireflies, if the ratio between the function value and the probability of sampling that value is large, the estimate of I can be large when not fully converged. In an ideal situation, when the value of $f(\overline{x})$ is large, the value of $p(\overline{x})$ is also large. However, issues arise when a low-probability event occurs. These events not only cause large radiance values, but also increase the variance.

Beneficial features of using half buffers (e.g., half buffers 202 and 204) according to embodiments described herein can be quantified in terms of probability. Let X represent a random variable that counts the number of successes in generating a firefly through Bernoulli trials with probability p. For any given pixel, the probability of a firefly being generated in that pixel over n samples comes from a binomial distribution as follows:

$$Pr(X \geq 1) = 1 - Pr(X = 0) \quad (2)$$
$$= 1 - \binom{n}{0} p^0 (1-p)^n$$
$$= 1 - (1-p)^n$$

In Equation (3) below, A denotes the event that the number of fireflies is greater than or equal to one for the pixel in one half buffer, and B denotes the event that the number of fireflies is greater than or equal to one for the pixel in the other half buffer. According to at least one particular embodiment, each half buffer receives approximately half of the samples, or approximately n/2 samples. As such, the probability of generating fireflies in a half buffer is therefore $Pr(A)=Pr(B)=1-(1-p)^{n/2}$. According to at least one particular embodiment, sampling each half buffer is performed independent from one another. As such, the probability of generating a firefly in both half buffers is given in Equation 3 below.

$$Pr(A \cap B) = [1-(1-p)^{n/2}]^2 \quad (3)$$

If fireflies are viewed as discrete outlier events, each half buffer is less likely to generate a firefly because it receives half the samples (although it is also less converged). Comparing the half buffers to one another further reduces the likelihood of a false positive.

Figure 7:
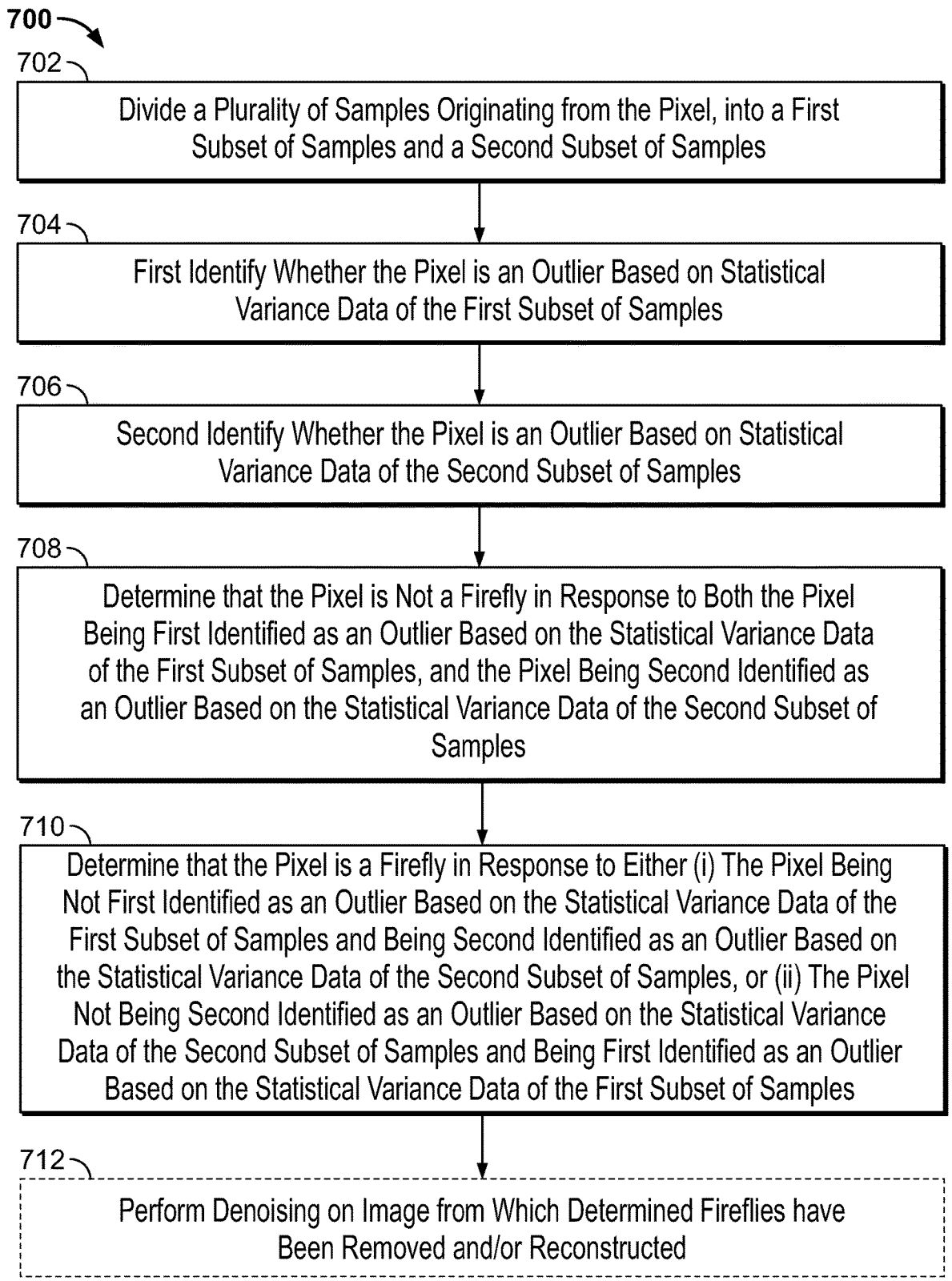
FIG. 7 is a flowchart illustrating a method of determining whether a pixel of a computer-rendered image is a firefly according to at least one embodiment.

FIG. 7 illustrates a flowchart of a method 700 of determining whether a pixel of a computer-rendered image is a firefly according to at least one embodiment.

At block 702, a plurality of samples originating from the pixel are divided into a first subset of samples and a second subset of samples (see, e.g., half buffers 202 and 204 of FIG. 2A). According to a particular embodiment, the plurality of samples may be evenly divided into the first subset of samples and the second subset of samples. The dividing may include randomly selecting at least three samples of the plurality of samples for inclusion in the first subset of samples, and randomly selecting at least three other samples of the plurality of samples for inclusion in the second subset of samples.

At block 704, it is first identified whether the pixel is an outlier based on statistical variance data of the first subset of samples (e.g., half buffer 202). For example, for each pixel region of a plurality of pixel regions (e.g., pixel regions 610, 620, 630, 640, etc.), it is identified whether the pixel is an outlier with respect to statistical variance data of pixels in the pixel region.

Identifying whether the pixel is an outlier with respect to statistical variance data of pixels in the pixel region may include applying a Generalized ESD Test for Outliers based on the statistical variance data of the pixels in the pixel region.

With continued reference to block 704, the first identification may include identifying, with respect to each of a number of pixel regions (e.g., 25 partially overlapping pixel regions) whether the pixel is an outlier with respect to statistical variance data of pixels in the pixel region. According to at least one particular embodiment, the pixel is first identified as an outlier if, in each and every pixel region (e.g., in each of the 25 pixel regions), the pixel is identified as being an outlier with respect to statistical variance data of pixels in the pixel region.

For example, referring to FIG. 6B, image samples may be obtained for each pixel in the pixel region 610. In this example, half of those image samples may be placed into the first subset of samples, and the data in the first subset of samples are used to determine the statistical variance data for each of the pixels within the pixel region 610. Then, to determine whether the pixel 602-2 is an outlier with respect to the other pixels in the pixel region 610, the statistical variance data for the pixel 602-2 is compared with the statistical variance data of the remaining pixels in the pixel region 610. The pixel 602-2 is identified as being an outlier with respect to the other pixels in the pixel region 610 if the statistical variance data of the pixel 602-2 is greater than the statistical variance data of the remaining pixels. This process may be repeated for other pixel regions.

At block 706, it is second identified whether the pixel is an outlier based on statistical variance data of the second subset of samples (e.g., half buffer 204). For example, for each pixel region of a plurality of pixel regions (e.g., pixel regions 610, 620, 630, 640, etc.), it is identified whether the pixel is an outlier with respect to statistical variance data of pixels in the pixel region.

Identifying whether the pixel is an outlier with respect to statistical variance data of pixels in the pixel region may include applying a Generalized ESD Test for Outliers based on the statistical variance data of the pixels in the pixel region.

With continued reference to block 706, the second identification may include identifying, with respect to each of a number of pixel regions (e.g., 25 partially overlapping pixel regions) whether the pixel is an outlier with respect to statistical variance data of pixels in the pixel region. According to at least one particular embodiment, the pixel is second identified as an outlier if, in each and every pixel region (e.g., in each of the 25 pixel regions), the pixel is identified as being an outlier with respect to statistical variance data of pixels in the pixel region.

For example, referring to FIG. 6B, image samples may be obtained for each pixel in the pixel region 610. In this example, the remaining half of those image samples may be placed into the second subset of samples, and the data in the second subset of samples are used to determine the statistical variance data for each of the pixels within the pixel region 610. Then, to determine whether the pixel 602-2 is an outlier with respect to the other pixels in the pixel region 610, the statistical variance data for the pixel 602-2 is compared with the statistical variance data of the remaining pixels in the pixel region 610. The pixel 602-2 is identified as being an outlier with respect to the other pixels in the pixel region 610 if the statistical variance data of the pixel 602-2 is greater than the statistical variance data of the remaining pixels. This process may be repeated for other pixel regions.

According to a particular embodiment, the first identifying of block 704 and the second identifying of block 706 are performed independently of each other.

At block 708, it is determined that the pixel is not a firefly in response to both the pixel being first identified as an outlier based on the statistical variance data of the first subset of samples, and the pixel being second identified as an outlier based on the statistical variance data of the second subset of samples. For example, it is determined that the pixel is not a firefly in response to both the pixel being identified as an outlier based on the statistical variance data of the first subset of samples (e.g., half buffer 202), and the pixel being identified as an outlier based on the statistical variance data of the second subset of samples (e.g., half buffer 204).

At block 710, it is determined that the pixel is a firefly in response to either the pixel being not first identified as an outlier based on the statistical variance data of the first subset of samples, or the pixel not being second identified as an outlier based on the statistical variance data of the second subset of samples. For example, it is determined that the pixel is a firefly in response to a situation in which the pixel is not identified as an outlier based on the statistical variance data of the first subset of samples (e.g., half buffer 202), but is identified as an outlier based on the statistical variance data of the second subset of samples (e.g., half buffer 204). As another example, it is determined that the pixel is a firefly in response to a situation in which the pixel is identified as an outlier based on the statistical variance data of the first subset of samples (e.g., half buffer 202), but is not identified as an outlier based on the statistical variance data of the second subset of samples (e.g., half buffer 204).

At block 712, one or more denoising algorithms or processes may be performed. The denoising is performed on an image from which determined fireflies, if any, have been removed and/or reconstructed.

Figure 8:
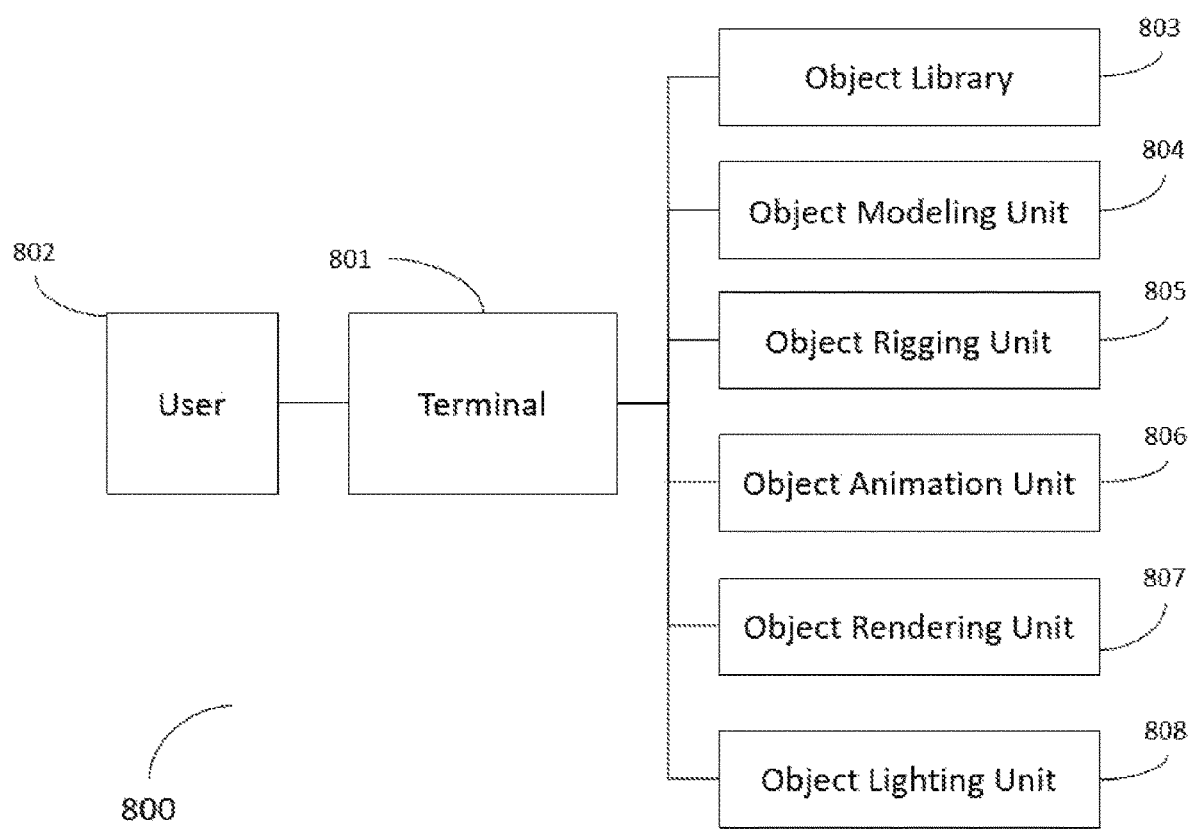
FIG. 8 is an illustration of a computing environment according to at least one embodiment.

Referring now to FIG. 8, a simplified block diagram of a system 800 for creating computer graphics imagery (CGI) and computer-aided animation is shown that may implement or incorporate various embodiments of the present disclosure. The system 800 may include one or more terminals 801. The one or more terminals 801 may include hardware and software elements configured for designing CGI and assisting with computer-aided animation. The terminals 801 may be implemented as a single computing device or a set of one or more computing devices, corresponding to computer hardware and/or software.

Examples of terminals 801 may be desktop computers, laptop computers, workstation computers, mainframes, cluster computing systems, cloud computing terminals, embedded computing devices, computer graphics devices, gaming devices and consoles, video media playback devices, consumer electronic devices having programmable processors, or the like. The one or more terminals 801 may be utilized at various stages of a production process, including pre-production, modeling, designing, creating, editing, simulating, animating, rendering, post-production, finishing, publishing, and the like, to produce recordings, computer files, tangible materials, and the like, related to or comprising images, image sequences, motion pictures, video, audio, or associated effects related to CGI and animation.

In an example of system 800, a user 802 may utilize the one or more terminals 1101 to design, create, or modify objects within a computer-generated interface displayed on display associated with the terminal 801.

The terminal may implement, include, or otherwise be in operable communication with, systems and units including object library 803, object modeling unit 804, object rigging unit 805, object animation unit 806, object rendering unit 807, and object lighting unit 808. Object library 803 may include software and/or hardware elements configured for storing and accessing information related to objects to be accessed, requested, retrieved, and/or used by the one or more terminals 801 to design, create, and modify 3D models of objects in the CGI and animation processes.

Object modeling unit 804 may include software and/or hardware elements and information to be accessed, requested, retrieved, and/or used by the one or more terminals 801 to sculpt and design the 3D model to take on the desired appearance as instructed by user 802, or other terminal operator during the CGI and animation process.

Object rigging unit 805 may include software and/or hardware elements and information to be accessed, requested, retrieved, and/or used by the one or more terminals 801 to design, create, or modify components of 3D models to define articulation points and movement ranges of various elements of the 3D model.

Object animation unit 806 may include software and/or hardware elements and information to be accessed, requested, retrieved, and/or used by the one or more terminals 801 to design, create, or modify animation aspects of a 3D model, including specifying the motion and position of various elements of the 3D model over time during the animation, such as specifying animation paths, cues, or the like or generating key frames or intermediary frames for animated motion of the 3D model.

Object rendering unit 807 may include software and/or hardware elements and information to be accessed, requested, retrieved, and/or used by the one or more terminals 801 to design, create, or modify a final appearance of the animated 3D model, including generating one or more images of one or more computer-generated objects, including textures, colors, rigging, controls, and the like.

Object lighting unit 808 may include software and/or hardware elements and information to be accessed, requested, retrieved, and/or used by the one or more terminals 801 to design, create, or modify lighting aspects of a 3D model and animated scenes, including defining lighting sources, shading, reflections, refractions, textures, colors, and the like.

The one or more terminals 801 may be in communication with one or more server computers which may operatively in communication with one or more data stores (e.g., databases, indexes, files, or other data structures). The one or more server computers may connect to a data communication network comprising a local area network (LAN), a wide area network (WAN) (e.g., the Internet), a telephone network, a satellite or wireless communication network, or some combination of these or similar networks.

In selected embodiments, the one or more server computers may implement one or more processes, systems, or units of the animation system, including object library 803, object modeling unit 804, object rigging unit 805, object animation unit 806, object rendering unit 807, object lighting unit 808, and the like. The one or more terminals 801, the one or more server computers, or any other aspect of the system 800, may be associated or coupled with a display configured to display information, including a displayed interface for displaying, performing, executing, instructing, reviewing, and/or selecting operations of the present disclosure.

Figure 9:
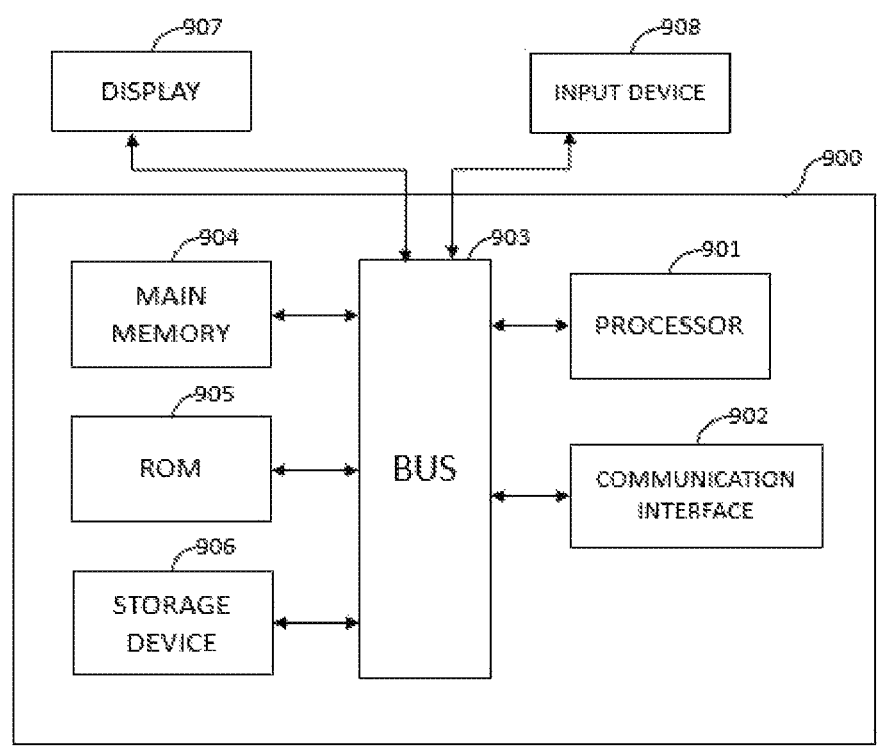
FIG. 9 is a block diagram of a device according to at least one embodiment.

Referring to FIG. 9, an illustration of an example computer 900 is provided. One or more of aspects of the system 800 discussed above in FIG. 8, such as the one or more terminals 801 or the one or more server computers, may be configured as or include such a computer 900. In selected embodiments, the computer 900 may include a bus 903 (or multiple buses) or other communication mechanism, a processor 901, main memory 904, read only memory (ROM) 905, one or more additional storage devices 906, and/or a communication interface 902, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 903 or other communication mechanism, including multiple such buses or mechanisms, may support communication of information within the computer 900. The processor 901 may be connected to the bus 903 and process information. In selected embodiments, the processor 901 may be a specialized or dedicated microprocessor configured to perform particular tasks in accordance with the features and aspects disclosed herein by executing machine-readable software code defining the particular tasks. Main memory 904 (e.g., random access memory—or RAM—or other dynamic storage device) may be connected to the bus 903 and store information and instructions to be executed by the processor 901. Main memory 904 may also store temporary variables or other intermediate information during execution of such instructions.

ROM 905 or some other static storage device may be connected to a bus 903 and store static information and instructions for the processor 901. An additional storage device 906 (e.g., a magnetic disk, optical disk, memory card, or the like) may be connected to the bus 903. The main memory 904, ROM 905, and the additional storage device 906 may include a non-transitory computer-readable medium holding information, instructions, or some combination thereof, for example instructions that when executed by the processor 901, cause the computer 900 to perform one or more operations of a method as described herein. A communication interface 902 may also be connected to the bus 903. A communication interface 902 may provide or support two-way data communication between a computer 900 and one or more external devices (e.g., other devices contained within the computing environment).

In selected embodiments, the computer 900 may be connected (e.g., via a bus) to a display 907. The display 907 may use any suitable mechanism to communicate information to a user of a computer 900. For example, the display 907 may include or utilize a liquid crystal display (LCD), light emitting diode (LED) display, projector, or other display device to present information to a user of the computer 900 in a visual display. One or more input devices 908 (e.g., an alphanumeric keyboard, mouse, microphone, stylus pen) may be connected to the bus 903 to communicate information and commands to the computer 900. In selected embodiments, one input device 908 may provide or support control over the positioning of a cursor to allow for selection and execution of various objects, files, programs, and the like provided by the computer 900 and displayed by the display 907.

The computer 900 may be used to transmit, receive, decode, display, or the like one or more video files. In selected embodiments, such transmitting, receiving, decoding, and displaying may be in response to the processor 901 executing one or more sequences of one or more instructions contained in main memory 904. Such instructions may be read into main memory 904 from another non-transitory computer-readable medium (e.g., a storage device).

Execution of sequences of instructions contained in main memory 904 may cause the processor 901 to perform one or more of the procedures or steps described herein. In selected embodiments, one or more processors in a multi-processing arrangement may also be employed to execute sequences of instructions contained in main memory 904. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by the processor 901, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 902 may provide or support external, two-way data communication to or via a network link. For example, a communication interface 902 may be a wireless network interface controller or a cellular radio providing a data communication network connection. Alternatively, a communication interface 902 may comprise a local area network (LAN) card providing a data communication connection to a compatible LAN. In any such embodiment, a communication interface 902 may send and receive electrical, electromagnetic, or optical signals conveying information.

A network link may provide data communication through one or more networks to other data devices (e.g., one or more terminals 801 as shown in the system 800). For example, a network link may provide a connection through a local network of a host computer or to data equipment operated by an Internet Service Provider (ISP). An ISP may, in turn, provide data communication services through the Internet. Accordingly, a computer 900 may send and receive commands, data, or combinations thereof, including program code, through one or more networks, a network link, and communication interface 902. Thus, the computer 900 may interface or otherwise communicate with a remote server, or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for determining whether a pixel of a computer-rendered image is a firefly, the method comprising:
    dividing a plurality of samples originating from the pixel, into a first subset of samples and a second subset of samples;
    first identifying whether the pixel is an outlier based on statistical variance data of the first subset of samples;
    second identifying whether the pixel is an outlier based on statistical variance data of the second subset of samples;
    determining that the pixel is not a firefly in response to both the pixel being first identified as an outlier based on the statistical variance data of the first subset of samples, and the pixel being second identified as an outlier based on the statistical variance data of the second subset of samples; and
    determining that the pixel is a firefly in response to either (i) the pixel being not first identified as an outlier based on the statistical variance data of the first subset of samples and being second identified as an outlier based on the statistical variance data of the second subset of samples, or (ii) the pixel not being second identified as an outlier based on the statistical variance data of the second subset of samples and being first identified as an outlier based on the statistical variance data of the first subset of samples.

2. The method of claim 1, wherein the plurality of samples are evenly divided into the first subset of samples and the second subset of samples.

3. The method of claim 1, wherein dividing the plurality of samples comprises:
    randomly selecting at least three samples of the plurality of samples for inclusion in the first subset of samples; and
    randomly selecting at least three other samples of the plurality of samples for inclusion in the second subset of samples.

4. The method of claim 1, wherein the first identifying and the second identifying are performed independently of each other.

5. The method of claim 1, wherein first identifying whether the pixel is an outlier based on statistical variance data of the first subset of samples comprises:
    for each pixel region of a plurality of pixel regions, identifying whether the pixel is an outlier with respect to statistical variance data of pixels in the pixel region, wherein the plurality of pixel regions partially overlap one another.

6. The method of claim 5, wherein each pixel region of the plurality of pixel regions has dimensions of n×n pixels, wherein n denotes an integer greater than or equal to 4.

7. The method of claim 5, wherein:
    each pixel region of the plurality of pixel regions has dimensions of 5×5 pixels; and
    the plurality of pixel regions comprises 25 pixel regions.

8. The method of claim 5, wherein identifying whether the pixel is an outlier with respect to statistical variance data of pixels in the pixel region comprises applying a Generalized Extreme Studentized Deviate (ESD) Test for Outliers based on the statistical variance data of the pixels in the pixel region.

9. The method of claim 5, wherein:
    the pixel is first identified as an outlier based on the statistical variance data of the first subset of samples in response to the pixel being identified as being an outlier with respect to statistical variance data of pixels in each of a threshold number of the plurality of pixel regions.

10. The method of claim 5, wherein:
    the pixel is first identified as an outlier based on the statistical variance data of the first subset of samples in response to the pixel being identified as being an outlier with respect to statistical variance data of pixels in each and every pixel region of the plurality of pixel regions.

11. A machine-readable non-transitory medium having stored thereon machine-executable instructions for determining whether a pixel of a computer-rendered image is a firefly, the instructions comprising:
    dividing a plurality of samples originating from the pixel, into a first subset of samples and a second subset of samples;
    first identifying whether the pixel is an outlier based on statistical variance data of the first subset of samples;
    second identifying whether the pixel is an outlier based on statistical variance data of the second subset of samples;
    determining that the pixel is not a firefly in response to both the pixel being first identified as an outlier based on the statistical variance data of the first subset of samples, and the pixel being second identified as an outlier based on the statistical variance data of the second subset of samples; and determining that the pixel is a firefly in response to either (i) the pixel being not first identified as an outlier based on the statistical variance data of the first subset of samples and being second identified as an outlier based on the statistical variance data of the second subset of samples, or (ii) the pixel not being second identified as an outlier based on the statistical variance data of the second subset of samples and being first identified as an outlier based on the statistical variance data of the first subset of samples.

12. The machine-readable non-transitory medium of claim 11, wherein the plurality of samples are evenly divided into the first subset of samples and the second subset of samples.

13. The machine-readable non-transitory medium of claim 11, wherein dividing the plurality of image samples comprises:

randomly selecting at least three samples of the plurality of samples for inclusion in the first subset of samples; and randomly selecting at least three other samples of the plurality of samples for inclusion in the second subset of samples.

14. The machine-readable non-transitory medium of claim 11, wherein the first identifying and the second identifying are performed independently of each other.

15. The machine-readable non-transitory medium of claim 11, wherein first identifying whether the pixel is an outlier based on statistical variance data of the first subset of samples comprises:

for each pixel region of a plurality of pixel regions, identifying whether the pixel is an outlier with respect to statistical variance data of pixels in the pixel region, wherein the plurality of pixel regions partially overlap one another.

16. The machine-readable non-transitory medium of claim 15, wherein each pixel region of the plurality of pixel regions has dimensions of n×n pixels, wherein n denotes an integer greater than or equal to 4.

17. The machine-readable non-transitory medium of claim 15, wherein:

each pixel region of the plurality of pixel regions has dimensions of 5×5 pixels; and the plurality of pixel regions comprises 25 pixel regions.

18. The machine-readable non-transitory medium of claim 15, wherein identifying whether the pixel is an outlier with respect to statistical variance data of pixels in the pixel region comprises applying a Generalized Extreme Studentized Deviate (ESD) Test for Outliers based on the statistical variance data of the pixels in the pixel region.

19. The machine-readable non-transitory medium of claim 15, wherein:

the pixel is first identified as an outlier based on the statistical variance data of the first subset of samples in response to the pixel being identified as being an outlier with respect to statistical variance data of pixels in each and every pixel region of the plurality of pixel regions.

20. A system for determining whether a pixel of a computer-rendered image is a firefly, the system comprising one or more controllers configured to:

divide a plurality of samples originating from the pixel, into a first subset of samples and a second subset of samples;

first identify whether the pixel is an outlier based on statistical variance data of the first subset of samples;

second identify whether the pixel is an outlier based on statistical variance data of the second subset of samples;

determine that the pixel is not a firefly in response to both the pixel being first identified as an outlier based on the statistical variance data of the first subset of samples, and the pixel being second identified as an outlier based on the statistical variance data of the second subset of samples; and determine that the pixel is a firefly in response to either (i) the pixel being not first identified as an outlier based on the statistical variance data of the first subset of samples and being second identified as an outlier based on the statistical variance data of the second subset of samples, or (ii) the pixel not being second identified as an outlier based on the statistical variance data of the second subset of samples and being first identified as an outlier based on the statistical variance data of the first subset of samples.

* * * * *